United States Patent [19]

Durrani

[11] Patent Number: 5,743,555
[45] Date of Patent: Apr. 28, 1998

[54] AIR ACTUATED HORN SWITCH FOR A VEHICLE STEERING WHEEL ASSEMBLY

[75] Inventor: Sheryar Durrani, Canton, Mich.

[73] Assignee: Breed Automotive Technology, Inc., Lakeland, Fla.

[21] Appl. No.: 674,654

[22] Filed: Jun. 25, 1996

[51] Int. Cl.⁶ ................................... B60R 21/16
[52] U.S. Cl. .................. 280/731; 74/484 H; 74/552; 200/61.54; 200/83 Z; 439/15
[58] Field of Search ................ 280/731, 728.1; 200/61.54, 832; 74/484 H, 552; 439/15

[56] References Cited

U.S. PATENT DOCUMENTS

| | | | |
|---|---|---|---|
| 4,844,359 | 7/1989 | Kato | 280/731 |
| 5,113,048 | 5/1992 | Lafferty | 200/83 Z |
| 5,155,309 | 10/1992 | Dwyer | 200/83 Z |

FOREIGN PATENT DOCUMENTS 4016047  11/1991  Germany ........................ 280/731

*Primary Examiner*—Eric D. Culbreth
*Attorney, Agent, or Firm*—Howard & Howard

[57] ABSTRACT

A vehicle steering wheel assembly includes a steering wheel body having a hole and a flexible outer cover. The cover and steering wheel body defines an air chamber. A diaphragm is disposed in line with the hole and includes an electrically conductive film on an opposed face. In an off position, the electrically conductive material is spaced from a pair of circuit traces in the clockspring. The circuit traces control a horn function. An operator may apply a force to the outer cover which drives the diaphragm and the electrically conductive material into contact with the circuit traces. An electrical circuit is closed and actuates the horn function. When the force is removed from the outer cover, the electrically conductive material moves out of contact with the circuit traces and into an off position.

11 Claims, 2 Drawing Sheets

AIR ACTUATED HORN SWITCH FOR A VEHICLE STEERING WHEEL ASSEMBLY

BACKGROUND OF THE INVENTION

The present invention relates generally to a horn switch actuated indirectly through a steering wheel assembly of the vehicle by actuating a diaphragm disposed in a hole adjacent an essentially airtight chamber, thereby triggering the horn function.

Modern vehicles have an electrical horn switch disposed in a steering wheel assembly comprising a mechanical article having contact points spaced from each other. An operator depresses one of the contacts driving it toward the other contact to actuate the horn function. This type of horn switch assembly includes a combination of several connectors and can be very costly. If any of the connectors fails, the entire horn switch function will not work.

Modern steering wheel assemblies containing an airbag possess the additional complication of having to arrange the horn switch to accommodate the airbag. Because the airbag triggers by expanding outwardly through the outer cover of a steering wheel assembly, the horn switch must be accurately positioned so as not to interfere with the airbag. This limits the flexibility of the horn switch design and may unduly increase the cost of the horn switch.

The known art has not successfully designed a horn switch which addresses these problems. Accordingly, there remains a need for a reliable yet cost-effective horn switch for a steering wheel assembly.

SUMMARY OF THE INVENTION

The steering wheel assembly of the present invention provides a unique manner of actuating an electrical switch such as a horn switch for a vehicle. The steering wheel assembly includes a flexible outer cover and a steering wheel body having a hole, wherein the cover and steering wheel body define a chamber which may be substantially airtight. A moveable member, such as a diaphragm is disposed over the hole and includes an electrically conductive material on one side. An operator may trigger the horn switch by depressing the outer steering wheel cover which results in a force being applied on the diaphragm thereby forcing the conductive material into contact with circuit traces to actuate the horn function.

In a disclosed embodiment, the steering wheel body comprises a steering wheel armature and a hub plate which includes the hole. The diaphragm is positioned in line with the hole and the outer cover forms the airtight chamber above the hub plate. The steering wheel assembly also comprises a clock spring including a collar and ribbon cable having a pair of circuit traces to actuate the horn function of the vehicle. The collar has an extension received in the hole. The circuit traces are disposed adjacent but spaced from the diaphragm. Upon depressing the outer cover of the steering wheel assembly, air is forced toward the diaphragm. The conductive material and diaphragm are then forced into contact with the circuit traces, actuating the horn function. Upon releasing the outer cover, the diaphragm moves back to the off position, spaced from the circuit traces.

In essence, the present invention removes any horn switch from the area in front of the airbag. Only a simple diaphragm positioned adjacent the clock spring is required. This lowers the cost and complexity of the assembly.

The various junctures between the various components of the steering wheel assembly preferably comprise a hermetic seal. Thus, the volume of air in the chamber remains constant. The hub plate may include one or more bleed holes providing limited fluid communication between the chamber and the exterior environment. The chamber may therefore atmospherically equalize when the temperature of the air in the chamber changes.

These and other features of the present invention will be best understood from the following specification and drawings, of which the following is a brief description.

DETAILED DESCRIPTION OF A PREFERRED EMBODIMENT OF THE INVENTION

Figure 1:
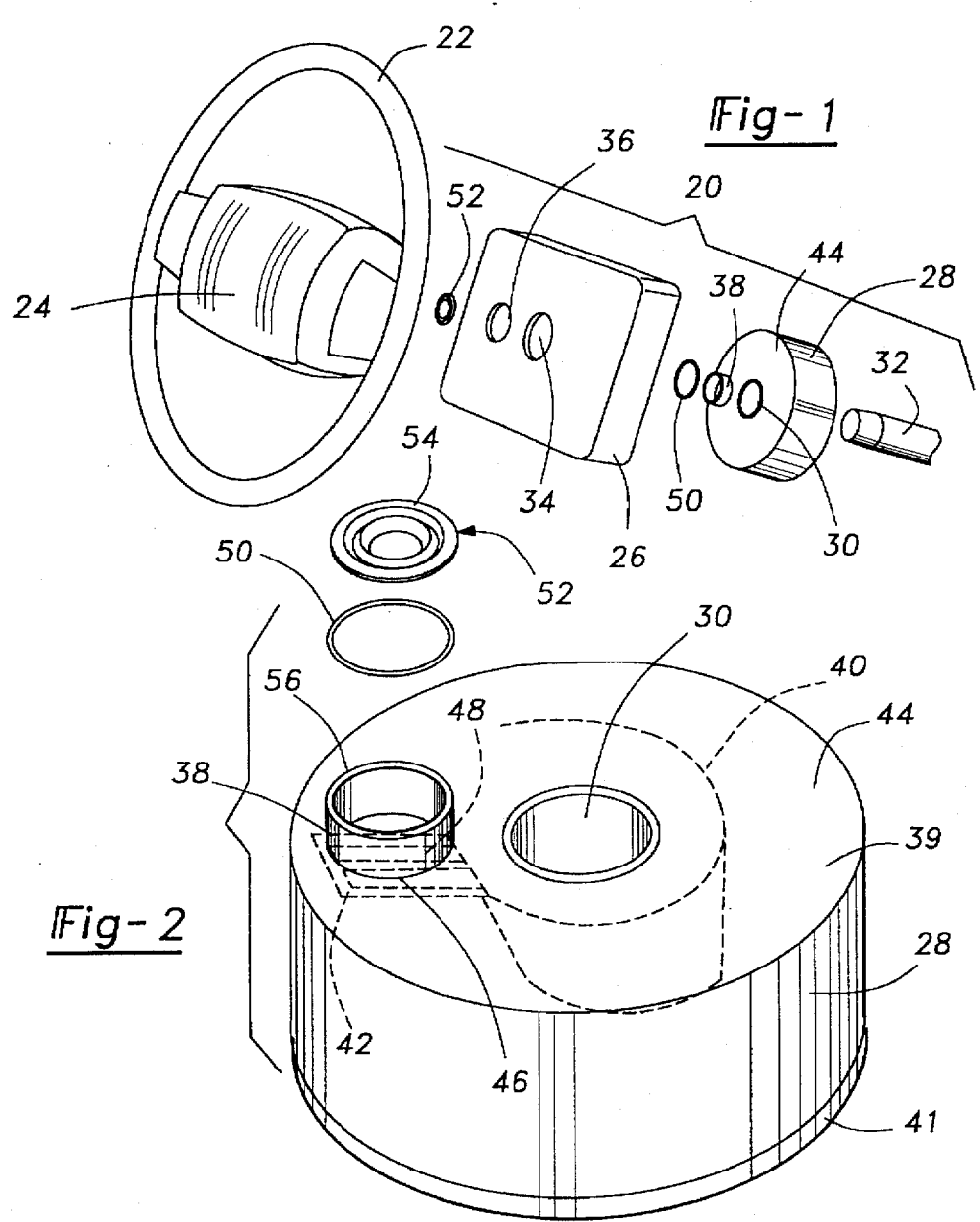
FIG. 1 is an exploded, perspective view of a steering wheel assembly according to the present invention.

A steering wheel assembly of the present invention is generally shown at 20 and includes a steering wheel 22 having an outer cover 24, a hub plate 26 and a clock spring 28. Clock spring 28 has an orifice 30 through which a steering column shaft 32 is received. Hub plate 26 also has an orifice 34 through which steering column shaft 32 is received. Steering column shaft 32 is secured to hub plate 34 in a known manner, but should be secured in a manner which provides a substantially airtight seal between hub plate 26 and steering column shaft 32. Hub plate 26 also has a hole 36 which receives a collar 38 of clock spring 28 as described below. Although hub plate 26 and wheel 22 are shown as separate parts, they may be integrally formed, or preassembled as a modular unit. Methods of connecting the two are shown in U.S. patent application Ser. No. 08/547,493.

Figure 2:
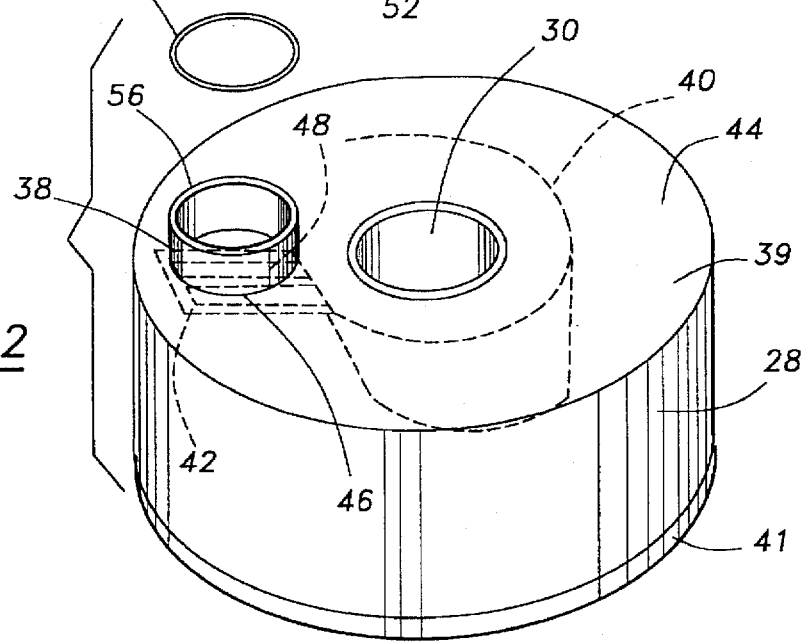
FIG. 2 is an exploded, perspective view of a diaphragm and clock spring of the steering wheel assembly.

As shown in FIG. 2, clock spring 28 including a first housing 39 secured to rotate with hub 26. As known in the art, a ribbon cable 40 is fixed to housing 39 at end 42, and to another housing 41 at a second end. Housing 41 (shown schematically) is fixed to a steering column housing and does not rotate with housing 39 and hub 26. The ribbon cable expands and contracts to accommodate relative rotation between housings 39 and 41.

Ribbon cable end 42 terminates adjacent collar 38. Collar 38 extends from a face 44 of clock spring 28. Ribbon cable 40 has circuit traces 46 and 48 at end 42. A seal 50 is disposed around collar 38 and abuts face 44 of clock spring 28 at the collar 38. Seal 50 helps provide and maintain a substantially airtight seal between clock spring 28 and hub plate 26. A diaphragm 52 is disposed over collar 38 such that an outer lip 54 of diaphragm 52 abuts an upper edge 56 of collar 38. Diaphragm 52 may comprise any flexible material which is preferably impervious to fluids and moisture. Such material may be selected from the group consisting of paper, plastic, and rubber. A polypropylene material is impervious to moisture and is thus particularly preferred. Diaphragm 52 has an electrically conductive film on a face thereof as described below.

Figure 3:
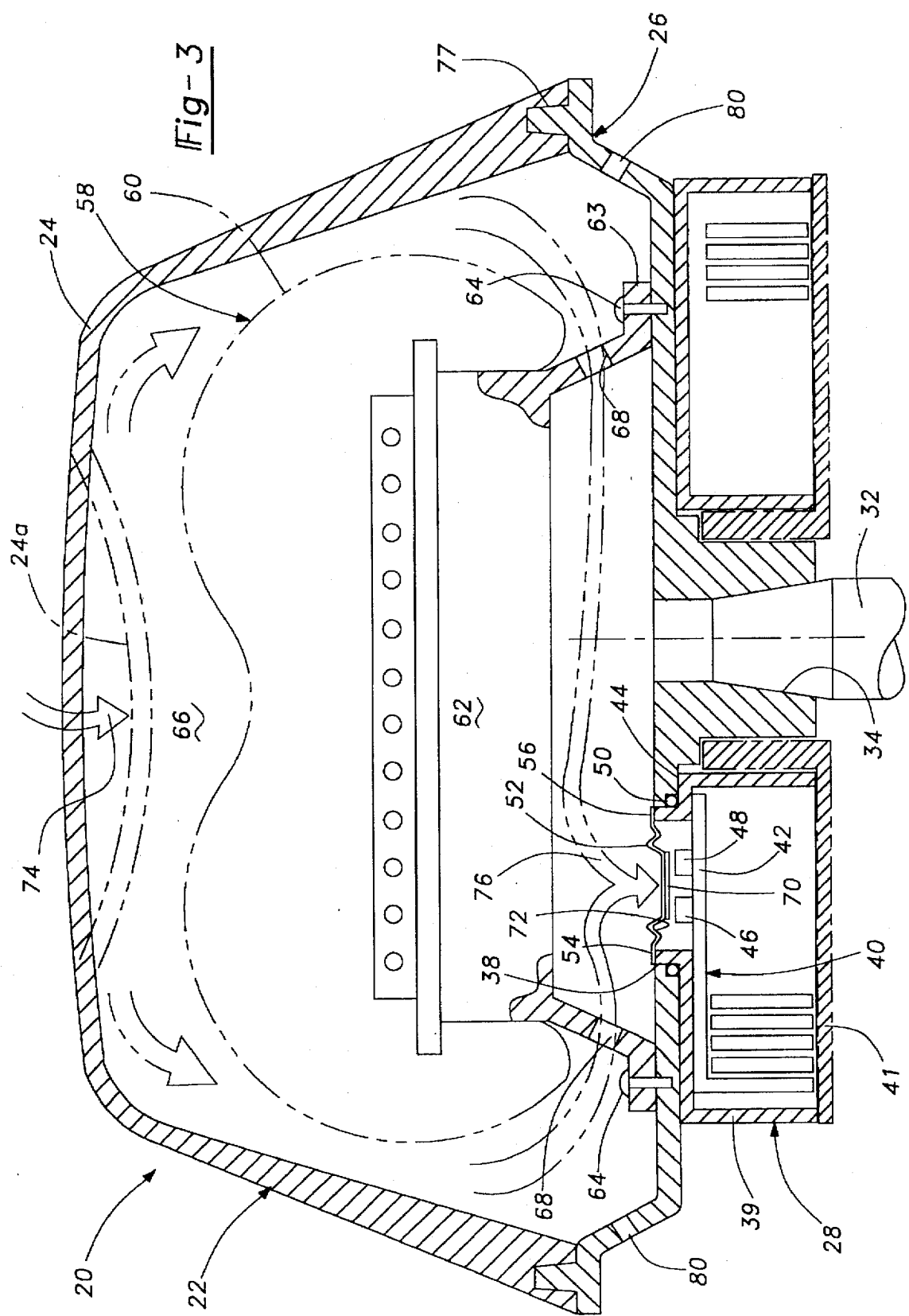
FIG. 3 is a cross-sectional view of the steering wheel assembly including a horn switch according to the present invention.

As shown in FIG. 3, steering wheel assembly 20 comprises an airbag assembly 58 including an airbag 60 and airbag inflator 62. Airbag inflator 62 is fastened to hub plate 26 such as by bolting a base 63 of inflator 62 to hub plate 26 using bolts 64. Airbag assembly 58 is disposed in a chamber 66 defined by outer cover 24 and hub plate 26. Base 63 of airbag inflator 62 has holes 68 providing fluid communication between upper and lower portions of chamber 66. Outer cover 24 is securely bonded to hub plate 26, thereby providing a substantially airtight environment to chamber 66.

An electrically conductive film 70 is disposed on a face 72 of diaphragm 52. In FIG. 3, film 70 is shown spaced from circuit traces 46 and 48, at an off position for an electrical switch such as a horn switch. Outer cover 24 comprises a relatively flexible material, and an operator may apply a force indicated by arrow 74, which deforms outer cover 24 inwardly toward hub plate 26 to a position 24a (shown in phantom). Because chamber 66 is substantially airtight, the volume in chamber 66 is constant. Thus, the fluid in chamber 66 (typically air) is forced downwardly away from force 74 which results in a force (indicated by arrow 76) being applied to diaphragm 52.

Figure 4:
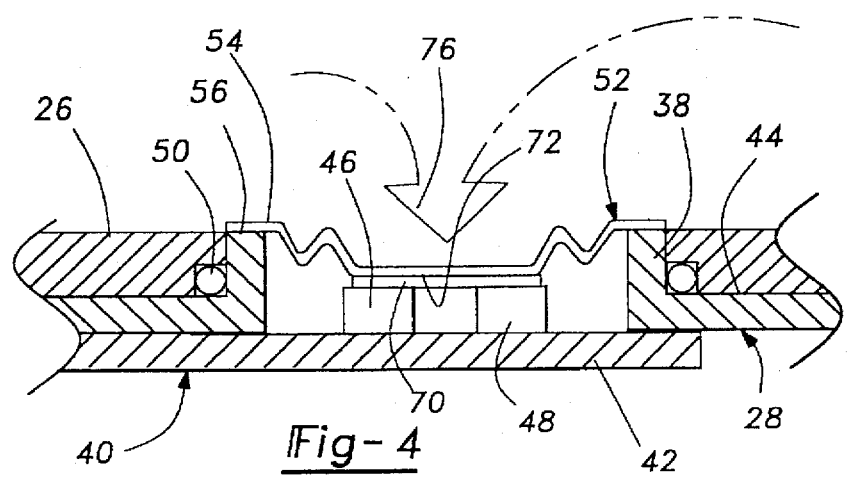
FIG. 4 is a cross-sectional view of the horn switch according to the present invention.

As shown in FIG. 4, the force 76 exerted on diaphragm 52 drives face 72 and film 70 toward circuit traces 46 and 48 until film 70 abuts circuit traces 46 and 48. In this on position, an electrical circuit is closed, thereby actuating an electrical function such as a horn function. As long as a force 74 is applied to outer cover 24, film 70 will remain in contact with traces 46, 48, thereby maintaining the horn switch in an on position. When force 74 is removed from outer cover 24, diaphragm 52 will move back to the off position shown in FIG. 3, with film 70 and diaphragm 52 spaced from circuit traces 46, 48.

When the operator removes force 74, the chamber 66 expands to its original size. The return of the cover creates a force urging the diaphragm back to the off position.

As used herein, the term "substantially airtight" means the volume in chamber 66 remains relatively constant over time. In a preferred embodiment, the junctures between the various components of steering wheel assembly 20 form hermetic seals. Thus, a juncture 77 between outer cover 24 and hub plate 26 forms a hermetic seal. Seal 50 also preferably forms a hermetic seal between hub plate 26 and clock spring 28. A hermetic seal is also preferably formed between hub plate 26 and steering column shaft 32. Lip 56 of diaphragm 52 also preferably forms a hermetic seal with clock spring collar 38.

Changes in ambient temperature may affect the functioning of the horn switch described above. Thus, hub plate 26 may include at least one bleed hole 80 which provide limited fluid communication between chamber 66 and the exterior air surrounding steering wheel assembly 20. Bleed holes 80 are sufficiently large enough to allow fluid to pass between chamber 66 and the exterior so that diaphragm 52 is not forced into contact with circuit traces 46 and 48 unintentionally. Thus, when the temperature rises to a certain level (for example, on a hot day), the fluid in chamber 66 will bleed through holes 80 to relieve the pressure in chamber 66, thereby avoiding actuating the horn switch. However, bleed holes 80 are small enough to prevent a significant amount of air from passing through holes 80 to the exterior when an operator applies a force to actuate the horn switch by depressing outer cover 24 as described above. That is, the horn function will continue working for an extended period by holding down outer cover 24 if the operator desires without losing pressure on diaphragm 52.

Although the present invention is described in terms of actuating a horn switch, the steering wheel assembly can be designed to actuate any type of electrical switch, such as a switch to flash the high beams of the headlights of a vehicle. Also, although the movable member is shown as a diaphragm, other movable arrangements may be utilized.

A preferred description of this invention has been disclosed; however, a worker of ordinary skill in the art would recognize that certain modifications would come within the scope of this invention. For that reason, the following claims should be studied in order to determine the true scope and content of this invention.

I claim:

1. A steering wheel assembly comprising:
   a steering wheel body having a hole;
   a flexible outer cover, said cover and steering wheel body defining a substantially airtight chamber;
   a clock spring having a collar and a ribbon cable having circuits traces at an end thereof adjacent said collar, said collar received in said hole and said traces controlling a horn function:
   a movable member in line with said hole and including an electrically conductive material on a side of the moveable member which is distal from the flexible outer cover, said electrically conductive material selectively contacting said circuit traces which control a horn function; and
   wherein compressing said cover drives said movable member and said electrically conductive material against said traces to actuate said horn function.

2. A steering wheel assembly as recited in claim 1, wherein said movable member is a diaphragm.

3. A steering wheel assembly as recited in claim 1, wherein there is at least one bleed hole providing atmospheric equalization to said substantially airtight chamber.

4. A steering wheel assembly comprising:
   a steering wheel body fixed to a hub plate having a hole;
   a flexible outer cover attached to said steering wheel body and hub plate and defining a substantially airtight chamber;
   a movable member disposed in line with said hole an including an electrically conductive material on a side of the moveable member which is distal from said flexible outer cover; and
   a clock spring containing a ribbon cable having a pair of circuit traces at an end thereof, said traces controlling a horn function, said traces being positioned adjacent said movable member, wherein compressing said cover drives said movable member and said electrically conductive material against said traces to actuate said horn function.

5. A steering wheel assembly as recited in claim 4, said movable member is a diaphragm.

6. A steering wheel assembly as recited in claim 4, wherein said hub plate contains all least one bleed hole providing atmospheric equalization to said substantially airtight chamber.

7. A steering wheel assembly comprising:
   a steering wheel;
   an airbag assembly;
   a flexible outer cover overlying said steering wheel and airbag assembly and defining a substantially airtight chamber;

a hub plate having a hole, said hub plate defining a rear face of the steering wheel assembly;

a diaphragm positioned over said hole and including an electrically conductive material on a side of the moveable member which is distal from the flexible outer cover; and wherein compressing said outer cover actuates said diaphragm to trigger an electrical switch.

8. A steering wheel assembly as recited in claim 7, wherein said electrically conductive material selectively contacts a pair of circuit traces which control a horn function while an operator depresses said outer cover.

9. A steering wheel assembly as recited in claim 8 further comprising a clock spring containing a collar and a ribbon cable having said circuits traces at an end thereof adjacent said collar, said collar received in said hole and said traces controlling a horn function, wherein compressing said cover drives said diaphragm and said electrically conductive material against said traces to actuate said horn function.

10. A steering wheel assembly as recited in claim 7, said outer cover forming said substantially airtight chamber adjacent said hub plate, wherein said airbag assembly is secured to said hub plate and disposed within said chamber, providing fluid communication between upper and lower portions of said chamber.

11. A steering wheel assembly as recited in claim 10 wherein said hub plate contains at least one bleed hole providing atmospheric equalization to said chamber.

* * * * *